March 14, 1961

M. J. DEMO 2,974,533

DRILL HAMMER

Filed Jan. 31, 1955

INVENTOR.
MAX J. DEMO
BY HIS ATTORNEYS.
HARRIS, KIECH, FOSTER & HARRIS

United States Patent Office 2,974,533
Patented Mar. 14, 1961

2,974,533
DRILL HAMMER

Max J. Demo, Santa Monica, Calif., assignor to Joseph Morris, doing business as De Mor Engineering Co., Santa Monica, Calif.

Filed Jan. 31, 1955, Ser. No. 485,005

10 Claims. (Cl. 74—22)

The present invention relates in general to a mechanical hammer for simultaneously reciprocating and continuously rotating a tool such as a drill, and to a chuck for holding the tool. While not limited thereto, the present invention finds particular utility in the drilling of rock, or similar materials, the hammering action applied to a rock drill by the invention, coupled with the rotary motion imparted to the drill thereby, resulting in extremely high drilling rates in such materials.

A primary object of the invention is to provide a mechanical hammer which includes a stationary cam member and a movable cam member rotatable about and reciprocable along the axis of the cam members, and which includes interengageable balls carried by the two cam members for moving the movable cam member axially periodically in response to rotation thereof, the tool to be simultaneously reciprocated and rotated being connected to the movable cam member. By employing interengageable balls on the cam members to axially displace the movable cam member periodically, sharp, hammering blows are produced by the tool connected to the movable cam member with minimum friction in and wear of the hammering means, i.e., the interengageable balls carried by the two cam members.

More particularly, a primary object of the invention is to provide stationary and movable cam members having opposed, transverse faces carrying the interengageable balls for periodically displacing the movable cam member axially to produce the desired hammering action at the tool connected to the movable cam member.

An important object of the invention is to employ paired, radially spaced balls in one cam-member face and single balls in the other cam-member face, and to locate the single balls and the midpoints of the ball pairs at equal distances from the axis of the cam members, the ball pairs and the single balls being circumferentially spaced equal distances.

With the foregoing construction, the single balls in one cam-member face pass between the balls of the respective pairs as they engage them to produce the desired axial displacement of the movable cam member. Consequently, no radial, or side, loads are imposed on the movable cam member as it is displaced axially in response to rotation thereof, the single balls in one cam-member face cooperating with the paired balls in the other cam-member face to constantly tend to center the movable cam member so as to prevent imposing radial loads on the bearings in which the movable cam member rotates, which is an important feature of the invention.

Another object is to provide means for rotating the movable cam member which extends through the stationary cam member, the interengageable balls carried by the two cam-member faces being circumferentially spaced around such means.

Another object is to provide balls for keying the movable cam member to its driving means, such balls transmitting rotation of the driving means to the movable cam member while permitting axial displacement of the movable cam member relative to the driving means.

Another object of the invention is to provide a chuck for engagement with the shank of a tool which restrains the tool shank against both rotation and axial displacement, the chuck of the invention being connected to the movable cam member of the hammer thereof.

More particularly, an object of the invention is to provide a chuck comprising a socket connected to the movable cam member and having a radial aperture into which a detent extends, the detent being insertable through the socket aperture into a recess in the tool shank. This recess is disposed intermediate the ends of the tool shank and terminates short of the ends thereof so that, when the detent is inserted through the socket aperture into such recess, the detent transmits rotary movement of the socket to the tool shank and also prevents withdrawal of the tool shank from the socket, which are important features. A related object is to provide such a tool shank.

Another object is to provide a chuck which includes cam means encircling the socket and the detent and engageable with cam means on the detent for moving the detent radially inwardly and outwardly through the socket aperture. A related object is to provide a detent having an arcuate cam disposed in an eccentric cam groove within a collar which encircles the detent and the socket, rotation of the collar relative to the socket producing radially inward and outward movement of the detent through the cooperation of the arcuate cam on the detent and the eccentric cam groove within the collar.

Another object is to provide resilient means for biasing the detent inwardly, whereby the resilient means resists outward displacement of the detent and thus resists rotation of the collar under the influences of vibration, or the like. With this construction, once the detent has been displaced radially inwardly into the recess in the tool shank, the effects of vibration will not disengage the detent from the tool shank, which is an important feature.

Another object is to provide a chuck wherein the aforementioned resilient means encircles the socket and the detent and is disposed within the collar, the latter completely enclosing the detent and the resilient means. A related object is to provide a resilient means which is simply an O-ring.

The foregoing objects, advantages and features of the present invention, together with various other objects, advantages and features thereof which will become apparent, may be attained with the exemplary embodiment of the invention illustrated in the accompanying drawing and described in detail hereinafter. Referring to the drawing.

Figure 1:
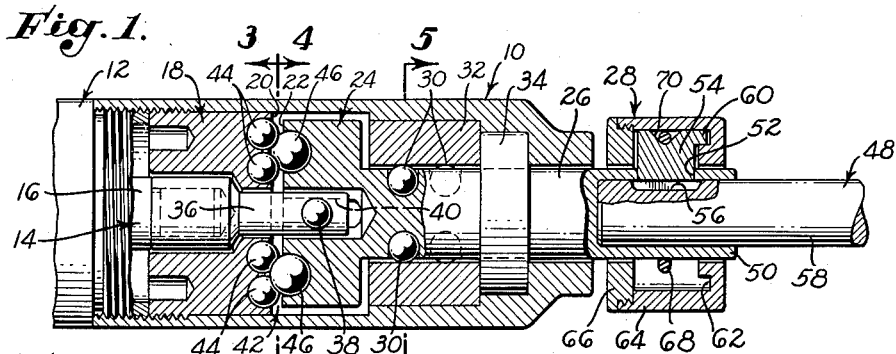
Fig. 1 is a longitudinal sectional view of a hammer and chuck of the invention, the hammer parts being shown in axially undisplaced positions.
Figure 2:
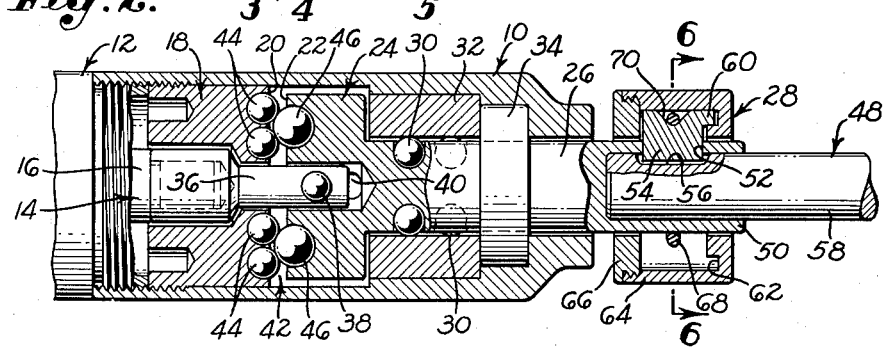
Fig. 2 is a longitudinal sectional view which is similar to Fig. 1, but which shows the hammer parts in axially displaced positions.
Figure 3:
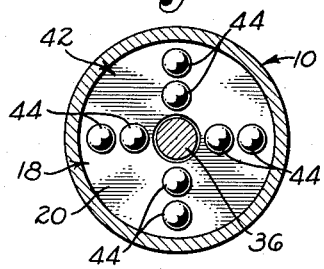
Figure 4:
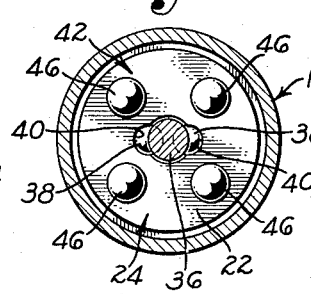
Figure 5:
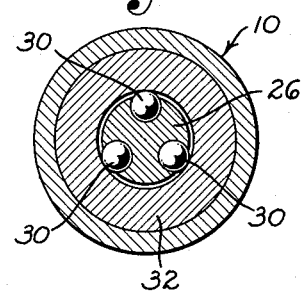
Figure 6:
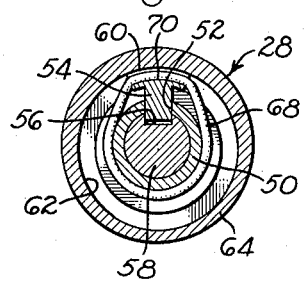

Figs. 3, 4 and 5 are transverse sectional views respectively taken as indicated by the arrowed lines 3—3, 4—4 and 5—5 of Fig. 1; and Fig. 6 is a transverse sectional view taken along the arrowed line 6—6 of Fig. 2.

In the drawing, the numeral 10 designates a housing of the mechanical hammer of the invention, which housing is shown as threaded on a supporting structure 12 which may be a portion of the housing of an electric motor, for example, for driving the invention, although any other suitable source of power may be utilized. A driving means 14, including a shaft 16, extends into the housing 10, the shaft 16 being the armature shaft of an electric motor, for example.

Disposed within and connected to the housing 10, as by being threaded thereinto, is a stationary cam member 18 having a transverse face 20. Axially spaced from the face 20 is a transverse face 22 of a movable cam member 24, the latter including a shaft 26 which projects from the housing 10 and which carries a chuck 28 of the invention, to be described hereinafter. The shaft 26 is provided with recesses for balls 30 which engage a bearing 32 in the housing 10, the balls 30 permitting rotation of the movable cam member 24 and permitting reciprocation thereof along the axis of the cam members. A lubricant seal 34 is disposed outwardly of the bearing 32 to prevent the leakage of lubricant from the housing along the shaft 26.

The driving means 14 includes a shaft 36 which is suitably secured to the shaft 16, as by threading it thereon. The shaft 36 extends through the stationary cam member 18 into an axial recess in the movable cam member 24, and is provided with recesses therein for balls 38 which extend into grooves 40 in the side wall of the recess in the movable cam member. The balls 38 serve to key the movable cam member 24 to the driving shaft 36 to transmit rotation of the driving shaft to the movable cam member, while permitting reciprocatory movement of the movable cam member along the axis of the cam members.

Considering the manner in which the movable cam member 24 is axially reciprocated, the invention provides hammer means, designated generally by the numeral 42, for this purpose. The hammer means 42 includes a plurality of pairs of balls 44 respectively disposed in recesses in the face 20 of the stationary cam member 18, and includes a plurality of single balls 46 in recesses in the face 22 of the movable cam member 24. The pairs of balls 44 are circumferentially spaced about the axis of the cam members and the balls 46 are circumferentially spaced thereabout the same distances. The balls 44 of each pair are radially spaced and the midpoints of the pairs of balls 44 are spaced radially outwardly from the cam-member axis a distance equal to that which the balls 46 are spaced radially outwardly therefrom.

With the foregoing construction, as the movable cam member 24 is rotated, the balls 46 pass between and over the balls 44 of the respective pairs of such balls to produce axial displacement of the movable cam member 24 toward the right, as viewed in the drawing. Such axial displacement of the movable cam member will be apparent from a comparison of Figs. 1 and 2 of the drawing. In Fig. 1, the balls 46 are shown as out of engagement with the paired balls 44. In Fig. 2 of the drawing, the balls 46 are shown as moving between and in engagement with the paired balls 44 to displace the movable cam member 24 toward the right. The movable cam member is returned to the left, as viewed in the drawing, by the load imposed on the outer end of a tool 48 carried by the chuck 28.

In the particular construction illustrated, the balls 46 project from their respective recesses farther than the balls 44 so that the balls 46 roll on the face 20 of the stationary cam member 18 while out of engagement with the balls 44. However, if desired, the balls 44 may project from their recesses farther than the balls 46 so that the balls 44 roll on the face 22 of the movable cam member 24 when out of engagement with the balls 46. Alternatively, the balls 44 and 46 may project equal distances from their recesses so that the balls 44 and 46 roll on the faces 22 and 20, respectively, when out of engagement with each other. Also, while the balls 46 have been shown as larger than the balls 44, the balls 44 may be larger than the balls 46, or the balls 44 and 46 may be of the same size. Also, while the paired balls 44 have been shown as carried by the face 20 of the stationary cam member 18 and the single balls 46 have been shown as carried by the face 22 of the movable cam member 24, the paired balls may be carried by the movable cam member and the single balls by the stationary cam member if desired. Further, the numbers of pairs of balls 44 and single balls 46 shown may be varied.

An important feature of the invention resulting from the use of the paired balls 44 in cooperation with the single balls 46 is that the movable cam member 24 is constantly centered by the interaction of these balls. This prevents the imposition of any side loads on the bearing 32, or on the shaft 36, which is an important feature of the invention.

Considering now the chuck 28, it includes a socket 50 which is shown as formed integrally with the shaft 26 of the movable cam member 24. The socket 50 is provided with a radial aperture 52 receiving a detent 54 of any suitable shape, shown as oblong, which is insertable through the aperture into a complementary recess 56 in a shank 58 of the tool 48, the shank seating in the socket. The recess 56 is intermediate the ends of the tool shank 58 and terminates short of the ends thereof so that, when the detent 54 is extended thereinto through the aperture 52, withdrawal of the tool shank from the socket is prevented. Thus, the detent 54, in addition to transmitting rotation of the socket 50 to the tool shank 58, prevents withdrawal of the tool shank from the socket, which is an imporant feature.

The detent 54 is provided, externally of the socket 50 with an arcuate cam 60 which is disposed in an internal, eccentric cam groove 62 in a knurled collar 64 which encircles the detent and the socket. The collar 64 is cup-shaped and the open end thereof is closed by a closure 66 threaded thereinto, whereby the detent retains the collar on the socket 50 and whereby the collar-closure 64—66 completely enclose the detent.

As will be apparent, the detent 54 may be moved radially inwardly from the position shown in Fig. 1 of the drawing to the position shown in Fig. 2 thereof by rotating the collar 64 through 90°, the cam 60 and cam groove 62 cooperating to accomplish this. Conversely, by rotating the collar 64 through 90° with the detent extended radially inwardly as shown in Fig. 2 of the drawing, the detent is retracted radially outwardly into the position shown in Fig. 1 of the drawing.

The detent 54 is biased radially inwardly by a resilient means 68 which encircles the detent and the socket 50 and which is enclosed by the collar-closure 64—66. Preferably, the resilient means 68 is simply an O-ring which encircles the socket 50 and the detent 54, being dsposed in a groove 70 in the detent. Since the resilient means 60 continuously biases the detent 54 radially inwardly, it resists any tendency of the collar-closure 64—66 to rotate under the influence of vibration, or the like, and thus resists any tendency for the collar-closure to move the detent radially outwardly to withdraw it from the recess 56 in the tool shank 58, which is an important feature.

Although I have disclosed an exemplary embodiment of my invention herein for purposes of illustration, it will be understood that various changes, modifications and substitutions may be incorporated in such embodiment without departing from the spirit of the invention as defined by the claims allowed to me and appearing hereinafter.

I claim as my invention:

1. In a device for simultaneously reciprocating and continuously rotating a tool, the combination of: a housing; a stationary cam member carried by said housing; a movable cam member carried by said housing and adapted to have the tool connected thereto, said movable cam member being rotatable and reciprocable relative to said stationary cam member; means for rotating said movable cam member; at least one pair of radially spaced balls carried by one of said cam members and spaced from the axis of rotation of said movable cam member; and at least one single ball carried by the other of said cam members and engageable with the balls of said pair to move said movable cam member axially periodically in response to rotation thereof, said single ball being spaced from the axis of rotation of said movable cam member a distance equal to the spacing of the midpoint of said ball pair therefrom.

2. A mechanical hammer, including: a stationary cam member; a movable cam member rotatable relative to said stationary cam member and reciprocable relative to said stationary cam member along its axis of rotation; at least one pair of radially spaced balls carried by one of said cam members and spaced from the axis of rotation of said movable cam member; and at least one single ball carried by the other of said cam members and engageable with said balls of said pair to move said movable cam member axially periodically in response to rotation thereof, said single ball being spaced from the axis of rotation of said movable cam member a distance equal to the spacing of the midpoint of said ball pair therefrom.

3. In a mechanical hammer, the combination of: axially aligned stationary and movable cam members respectively provided with opposed transverse faces, said movable cam member being rotatable relative to said stationary cam member about the axis of said cam members and being axially movable relative to said stationary cam member; a pair of radially spaced balls carried by said face of one of said cam members; and a single ball carried by said face of the other of said cam members and engageable with said balls of said pair, said single ball being spaced from said axis a distance equal to the spacing of the midpoint of said ball pair therefrom.

4. A mechanical hammer as defined in claim 3 wherein said pair of balls is carried by said face of said stationary cam member and wherein said single ball is carried by said face of said movable cam member.

5. A mechanical hammer as defined in claim 3 including means extending through said stationary cam member and connected to said movable cam member for rotating said movable cam member.

6. A mechanical hammer as defined in claim 3 including a plurality of pairs of balls each located as set forth in claim 3 and including a plurality of single balls each located as set forth in claim 3, said pairs of balls being circumferentially spaced and said single balls being circumferentially spaced, said circumferential spacings being equal.

7. In a mechanical hammer, the combination of: axially aligned stationary and movable cam members respectively provided with opposed transverse faces, said movable cam member being rotatable relative to said stationary cam member about the axis of said cam members and being axially movable relative to said stationary cam member; a pair of radially spaced balls carried by said face of one of said cam members; a single ball carried by said face of the other of said cam members and engageable with said balls of said pair, said single ball being spaced from said axis a distance equal to the spacing of the midpoint of said ball pair therefrom; and means for rotating said movable cam member.

8. In a mechanical hammer, the combination of: axially aligned stationary and movable cam members respectively provided with opposed transverse faces, said movable cam member beign rotatable relative to said stationary cam member about the axis of said cam members and being axially movable relative to said stationary cam member, said transverse faces respectively having circumferential spaced recesses therein which register periodically during each revolution of said movable cam member relative to said stationary cam member; rotatable cam elements disposed in and rotatable in said recesses, respectively, and projecting from said transverse faces, respectively, whereby said cam elements are interengageable periodically during each revolution of said movable cam member relative to said stationary cam member to move said movable cam member axially relative to said stationary cam member; and drive means extending through said stationary cam member along said axis for rotating said movable cam member.

9. In a mechanical hammer, the combination of: axially aligned stationary and movable cam members respectively provided with opposed transverse faces, said movable cam member being rotatable relative to said stationary cam member about the axis of said cam members and being axially movable relative to said stationary cam member, said transverse faces respectively having circumferentially spaced recesses therein which register periodically during each revolution of said movable cam member relative to said stationary cam member; rotatable cam elements disposed in and rotatable in said recesses, respectively, and projecting from said transverse faces, respectively, whereby said cam elements are interengageable periodically during each revolution of said movable cam member relative to said stationary cam member to move said movable cam member axially relative to said stationary cam member; and drive means extending through said stationary cam member along said axis for rotating said movable cam member, said movable cam member being movable along said axis relative to said drive means.

10. In a mechanical hammer, the combination of: axially aligned first and second cam members, said second cam member being rotatable relative to said first cam member about the axis of said cam members and being axially movable relative to said first cam member; drive means extending axially through said first cam member for rotating said second cam member about said axis; and interengageable rotatable means on said first and second cam members, respectively, for moving said second cam member axially periodically during each revolution of said second cam member relative to said first cam member, each of said rotatable means comprising a plurality of rotatable cam elements carried by and spaced apart circumferentially of the corresponding cam member.

References Cited in the file of this patent

UNITED STATES PATENTS

| | | |
|---|---|---|
| 1,041,569 | Bade | Oct. 15, 1912 |
| 1,660,579 | Roth | Feb. 28, 1928 |
| 2,009,580 | Govanus | July 30, 1935 |
| 2,243,820 | Hermann | May 27, 1941 |
| 2,279,899 | Cherry | Apr. 14, 1942 |
| 2,377,554 | Huber | June 5, 1945 |
| 2,401,794 | Pratt | June 11, 1946 |
| 2,408,484 | Schwarzkopt | Oct. 1, 1946 |
| 2,458,929 | Clark | Jan. 11, 1949 |
| 2,630,723 | Gridley | Mar. 10, 1953 |
| 2,667,357 | Andreasson | Jan. 26, 1954 |
| 2,694,551 | Snyder | Nov. 16, 1954 |
| 2,742,265 | Snyder | Apr. 17, 1956 |
| 2,780,106 | Lovequist | Feb. 5, 1957 |